Patented July 7, 1942

2,288,976

UNITED STATES PATENT OFFICE 2,288,976

N-CHLORO, N-HYDROCARBON SUBSTITUTED SULPHAMATES

Michael Sveda, Cleveland, Ohio, assignor to E. I. du Pont de Nemours & Company, Wilmington, Del., a corporation of Delaware No Drawing. Application November 23, 1940, Serial No. 366,917

7 Claims. (Cl. 260—500)

This invention relates to chlorinated products containing sulphamic groups, and is more particularly directed to sulphamic acids and sulphamates which are N-substituted with a chlorine group and a hydrocarbon group, and is further directed to the production of such di-N-substituted compositions by processes in which sulphamic acids and sulphamates which are N-monosubstituted with a hydrocarbon group are treated with chlorinating agents.

Sulphamic acid, $NH_2SO_3H$, is a composition with which those in the art are familiar, a practicable method for its production being shown in the Baumgarten U. S. Patent 2,102,350. Sulphamic acids which are N-mono-substituted with a hydrocarbon group, such as methylsulphamic acid, $CH_3NHSO_3H$, and salts of these acids, such as sodium methylsulphamate, $CH_3NHSO_3Na$, are also well known and easily available.

Now I have found that compositions having great value as bleaching and disinfecting agents may be prepared by treating with chlorinating agents compounds which contain a sulphamic group and which are N-mono-substituted with a hydrocarbon group, whereby a further N-substitution with a chlorine group is effected. The products so produced are characterized by the presence of a sulphamic group which is N-substituted with both a chlorine group and a hydrocarbon group.

It will be understood that sulphamic groups are groups including the arrangement

and that N-substitution in such a group means a replacement of one or both of the hydrogen atoms joined to the nitrogen atom in the sulphamic group as it exists in sulphamic acid,

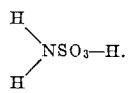

The compositions of this invention comprise compounds which contain a sulphamic group which is N-substituted by a chlorine group and by a hydrocarbon group. It will be understood that the hydrocarbon group may be any hydrocarbon group. Thus, alkyl groups, such as methyl, ethyl, propyl, and isopropyl groups, aryl groups, such as phenyl and naphthyl groups, aralkyl groups such as benzyl, beta-phenylethyl, and gamma-phenylpropyl groups, alkaryl groups such as tolyl and xylyl groups, cycloalkyl groups such as cyclobutyl, cyclopentyl, and cyclohexyl groups, and substituted cycloalkyl groups such as 2-methylcyclohexyl and 2-phenylcyclohexyl groups, are representative of the type of hydrocarbon group with which the sulphamic group may be N-substituted.

In order that the compositions and processes of my invention may be better understood, reference should be had to the following illustrative examples. Example I shows the preparation of a sodium N-chlorine substituted sulphamate which is also N-substituted with a hydrocarbon group, namely, the cyclohexyl group.

Example I

A solution of the chlorinating agent, sodium hypochlorite, was made by passing 7 parts by weight of gaseous chlorine into a strongly cooled solution of 12 parts of sodium hydroxide in 100 parts of water. A fraction comprising six-tenths of this solution at 25° C. was added to a solution of 10 parts of sodium N-cyclohexylsulphamate in 25 parts of water at 60° C. The resulting solution was stirred for ten minutes and then cooled to 10° C. A crop of white crystals which formed was removed by filtration, washed with cold water, and dried under vacuum over barium oxide.

Upon chemical analysis the crystals were found to have a composition corresponding closely with the formula, $C_6H_{11}NClSO_3Na$, sodium N-chloro, N-cyclohexylsulphamate. An aqueous solution of the crystals was found to be an effective bleaching and disinfecting agent.

In Example II there is shown the preparation of an N-chloro-substituted methylsulphamic acid according to a process of my invention.

Example II

A solution containing 11.1 parts by weight of methyl sulphamic acid in 90 parts of water was made up at 25° C. Into this solution there was introduced 7.1 parts by weight of chlorine gas at such a rate that the gas was completely absorbed.

There was obtained a solution which upon analysis was found to contain a composition corresponding closely with the formula

N-chloro, N-methylsulphamic acid, together with a chemically equivalent amount of hydrochloric acid. This solution was found to have effective bleaching and disinfecting properties.

In accordance with a process of my invention, N-chlorine substitution may be accomplished on the general class of compounds which are N- monohydrocarbon-group substituted and which contain the sulphamic group. In place of the sodium N-cyclohexylsulphamate and the methylsulphamic acid of Examples I or II, there may, for instance, be used such acids as ethylsulphamic acid, n-propylsulphamic acid, isopropylsulphamic acid, phenylsulphamic acid, benzylsulphamic acid, tolylsulphamic acid, or salts of any of these acids. The salt may be, for instance, the sodium, potassium, calcium, magnesium, iron, aluminum, zinc, tin, ammonium, substituted ammonium, or amine salts. Some representative compositions of my invention, therefore, are N-chloro, N-isopropylsulphamic acid; N-chloro, N-phenylsulphamic acid; N-chloro, N-benzylsulphamic acid; N-chloro, N-tolylsulphamic acid; sodium N-n-propyl sulphamate; calcium N-chloro, N-phenyl sulphamate; iron N-chloro, N-benzyl sulphamate; zinc N-chloro, N-tolyl sulphamate; and ammonium N-chloro, N-cyclohexyl sulphamate.

In place of the sodium hypochlorite or the chlorine of Examples I and II, there may be used as chlorinating agents various materials with which the art is already familiar for this purpose. For instance, such chlorinating agents as calcium hypochlorite, potassium hypochlorite, or hypochlorous acid may be employed. In using such chlorinating agents it will usually be found preferable to add them to an alkaline solution of the sulphamic compound being treated.

While I have shown certain illustrative compositions and processes, it will be understood that one skilled in the art without departing from the spirit of my invention may readily devise numerous processes and produce numerous compositions.

I claim:

1. In a process for producing compositions characterized by the presence of a sulphamic group which is N-substituted with both a chlorine group and a hydrocarbon group, the step comprising treating with a chlorinating agent a compound which contains a sulphamic group N-mono substituted with a hydrocarbon group.

2. In a process for producing compositions characterized by the presence of a sulphamic group which is N-substituted with both a chlorine group and a hydrocarbon group, the step comprising treating with sodium hypochlorite a compound which contains a sulphamic group N-mono substituted with a hydrocarbon group.

3. A compound having a sulphamic group which is N-substituted with both a chlorine group and a hydrocarbon group.

4. Sodium N-chloro N-cyclohexylsulphamate.

5. In a process for producing an N-chloro substituted, N-hydrocarbon substituted sulphamate, the step comprising treating with a chlorinating agent a sulphamate which is N-mono substituted with a hydrocarbon group.

6. In a process for producing an N-chloro substituted, N-hydrocarbon substituted sulphamate, the step comprising treating with sodium hypochlorite a sulphamate which is N-mono substituted with a hydrocarbon group.

7. A sulphamate which is N-substituted with both a chlorine group and a hydrocarbon group.

MICHAEL SVEDA.